R. B. WILLIAMSON.
DYNAMO ELECTRIC MACHINE.
APPLICATION FILED JUNE 27, 1910.
1,030,557.
Patented June 25, 1912.
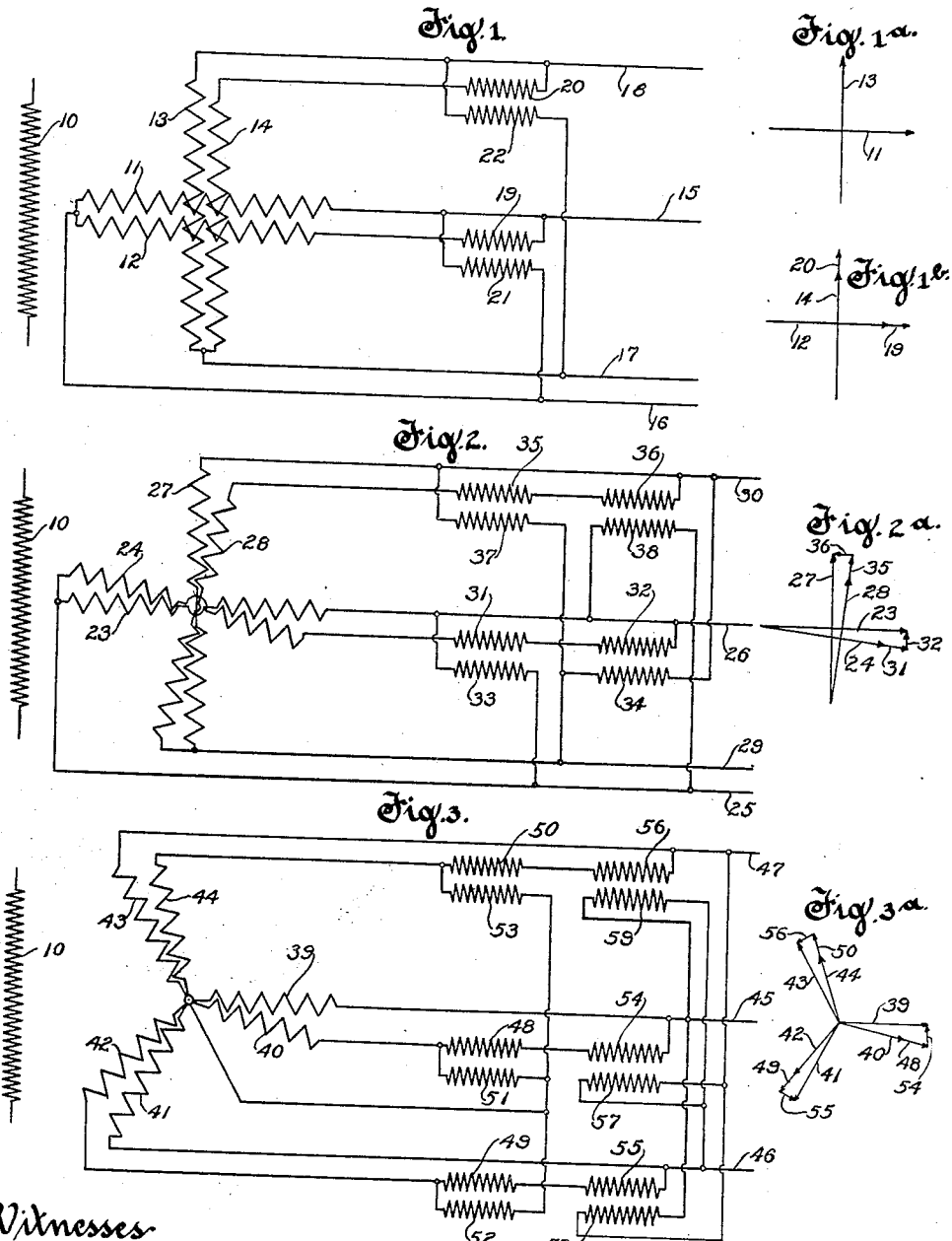

UNITED STATES PATENT OFFICE.

ROBERT B. WILLIAMSON, OF MILWAUKEE, WISCONSIN, ASSIGNOR TO ALLIS-CHALMERS COMPANY, A CORPORATION OF NEW JERSEY.

DYNAMO-ELECTRIC MACHINE.

1,030,557.  Specification of Letters Patent.  Patented June 25, 1912.

Application filed June 27, 1910. Serial No. 569,003.

*To all whom it may concern:*

Be it known that I, ROBERT B. WILLIAMSON, a citizen of the United States, residing at Milwaukee, in the county of Milwaukee and State of Wisconsin, have invented certain new and useful Improvements in Dynamo-Electric Machines, of which the following is a full, clear, and exact specification.

My invention relates to dynamo-electric machines.

Sometimes in the design of dynamo-electric machines it is necessary, for purposes of economy in space and copper, to connect in parallel windings in which the electromotive forces are not quite the same, either in value or in phase. In such cases there is a tendency to produce a circulating current through the parallel connected windings, and this current, because of the small impedance of the windings, may be large enough both to produce heavy losses and to cause excessive heating.

It is the object of my present invention to prevent such circulating currents. This result is accomplished by providing means for producing in the local circuit formed by such parallel-connected windings an electromotive force which will oppose such flow of current. In the preferred form of my invention this extra electromotive force is produced by means of a transformer having its secondary connected in such local circuit and its primary so connected that there is produced in the secondary an electromotive force opposing and substantially equal to the difference between the electromotive forces developed in the two parallel-connected windings. Sometimes more than one such transformer is used, in which case the vectorial sum of the electromotive forces produced in their secondaries is equal and opposite to such difference.

The various novel features of my invention will be apparent from the description and drawings and will be particularly pointed out in the claims.

Figure 1 shows diagrammatically a two-phase generator having for each phase two parallel-connected windings which develop electromotive forces of similar phase but unequal numerical value; Figs. 1$^a$ and 1$^b$ are vector diagrams, showing respectively the electromotive forces produced in the windings having the larger electromotive forces, and those produced in the other windings and added for corrective purposes. Fig. 2 shows diagrammatically a two phase generator having for each phase two parallel-connected windings which develop electromotive forces differing both in phase and in numerical value; Fig. 2$^a$ is a vector diagram of the electromotive forces produced in the scheme shown in Fig. 2; Fig. 3 shows diagrammatically a three phase generator having for each phase two parallel-connected windings which develop electromotive forces differing both in phase and in numerical value; and Fig. 3$^a$ is a vector diagram of the electromotive forces produced in the scheme shown in Fig. 3.

The arrangements shown in all three figures have the usual field windings 10, supplied from any suitable source. They also have armature windings in which there are one or more sets of parallel-connected windings, the different windings of a set developing electromotive forces which are not altogether similar.

The arrangement shown in Fig. 1 is a two-phase generator. One of the phases has the two windings 11 and 12, and the other the two windings 13 and 14. The electromotive force developed in the winding 11 is in phase with that developed in the winding 12, but is slightly larger in numerical value. Similarly, the electromotive force developed in the winding 13 is in phase with, but slightly larger numerically than, that developed in the winding 14. The electromotive forces developed in the windings 11 and 12 are, as is usual in two-phase generators, removed in phase 90° from those developed in windings 13 and 14. The windings 11 and 12 are connected in parallel to supply the mains 15 and 16, and the windings 13 and 14 are connected in parallel to supply the mains 17 and 18. There are local circuits produced by the windings 11 and 12, and 13 and 14, respectively, and in each of these local circuits a circulating current tends to flow, this current being equal to the difference between the two electromotive forces in the circuit divided by the impedance of the circuit. In order to prevent this flow of current, there are connected in these two local circuits the secondaries 19 and 20 of two transformers, the primaries 21 and 22 of which are connected respectively across mains 15 and 16, and 17 and 18; whereby there is produced in each of the secondaries 19 and 20 an electromotive force directly opposite to the difference between the electromotive forces developed in the two generator windings in the same local circuit. By properly designing the transformers, the opposing electromotive force developed in each of the secondaries 19 and 20 may be made equal to such difference. In other words, the electromotive forces produced in the secondaries 19 and 20 boost the electromotive forces produced in the windings 12 and 14 respectively to values equal to those produced in the windings 11 and 13 respectively. This is plainly shown in the vector diagrams of Figs. 1ª and 1ᵇ.

The arrangement shown in Fig. 2 is also a two-phase generator. Here for one phase there are the two windings 23 and 24 connected in parallel to the mains 25 and 26, and for the other the two windings 27 and 28 connected in parallel to the mains 29 and 30. The electromotive forces developed in the windings 24 and 28 are slightly less in numerical value than, and slightly out of phase with, those developed in the windings 23 and 27 respectively. To prevent this from causing a circulation of current in the local circuits formed by the parallel-connected windings 23 and 24, and 27 and 28, respectively, there are connected in each of such local circuits the secondaries of two transformers. In the local circuit formed by the windings 23 and 24 are the secondaries 31 and 32, the primaries 33 and 34 of which are connected respectively across the mains 25 and 26, and 29 and 30. Similarly in the local circuit formed by the windings 27 and 28 are the two secondaries 35 and 36, the primaries 37 and 38 of which are connected respectively across the mains 29 and 30, and 25 and 26. As a result of these connections there are produced in the secondaries 31 and 35 electromotive forces sufficient to boost the electromotive forces produced in the windings 24 and 28 so that they are equal to those produced in the windings 23 and 27 respectively, and in the secondaries 32 and 36 electromotive forces of proper phase and value to bring the electromotive forces produced in the windings 24 and 28 into phase with those produced respectively in the windings 23 and 27. This is clearly indicated in the vector diagram of Fig. 2ª.

Fig. 3 illustrates the same scheme applied to a three-phase generator. Here there are three pairs of windings 39 and 40, 41 and 42, and 43 and 44. The two windings of each pair are connected in parallel between the neutral and one of the three-phase mains 45, 46, and 47, and the electromotive force developed in each even-numbered winding is slightly less numerically than, and slightly out of phase with, that produced in the odd-numbered winding of the same pair. The even-numbered generator windings have connected in series with them the transformer secondaries 48, 49, and 50 respectively, the primaries 51, 52, and 53 of which are connected between the neutral of the system and the outer ends of the windings 40, 42, and 44 respectively. The electromotive forces produced in the transformer secondaries 48, 49, and 50 thus boost those developed in the generator windings 40, 42, and 44, to bring such latter electromotive forces into substantial numerical equality with those produced in the generator windings 39, 41, and 43. The even-numbered generator windings also have connected in series with them the transformer secondaries 54, 55, and 56 respectively, the primaries 57, 58, and 59 of which transformers are connected across the mains 46 and 47, 47 and 45, and 45 and 46 respectively. These transformers are so designed that the electromotive forces produced in their secondaries 54, 55, and 56 are sufficient to bring those developed in the generator windings 40, 42, and 44 into phase with those developed in the generator windings 39, 41, and 43 respectively. As a result of this arrangement of connections circulation of current in the several local circuits formed in the generator is prevented. The several electromotive forces involved are shown in the vector diagram of Fig. 3ª.

The precise arrangements here shown and described may be modified to suit the requirements of any machine, those illustrated being merely typical cases. All modifications which may be made without departing from the spirit and scope of my invention I aim to cover in the following claims.

What I claim as new is:

1. In a dynamo-electric machine, two parallel connected windings developing dissimilar electromotive forces, and means including a two-winding transformer one winding only of which is in the local circuit formed by such two parallel connected windings for producing therein an electromotive force tending to prevent such dissimilarity from producing a local current.

2. In a dynamo-electric machine, two parallel connected windings which develop unequal electromotive forces, and means including a transformer having a plurality of windings only one of which is in the local circuit formed by such two parallel connected windings for producing therein a third electromotive force which boosts the lesser of the first two electromotive forces into substantial equality with the larger of said first two electromotive forces.

3. In a dynamo-electric machine, two parallel-connected windings which develop electromotive forces of different phase, and means for producing in the local circuit formed by said two windings an electromotive force which tends to prevent such difference in phase from producing a local current.

4. In a dynamo-electric machine, two parallel-connected windings which develop electromotive forces of different phase, and means for bringing such electromotive forces into phase by adding to one of them an electromotive force of suitable phase and value.

5. In a dynamo-electric machine, two parallel-connected windings which develop electromotive forces of different phase, and means including a transformer for adding to one of said electromotive forces an electromotive force tending to prevent such difference in phase from producing a local current.

6. In a dynamo-electric machine, two parallel-connected windings which develop dissimilar alternating electromotive forces, a transformer having its secondary connected in the local circuit formed by said two windings and its primary connected to produce in the secondary an electromotive force tending to oppose any local current which such dissimilarity tends to produce.

7. In a dynamo-electric machine, two parallel-connected windings which produce unequal alternating electromotive forces, a transformer having its secondary connected in the local circuit formed by said two windings and its primary winding connected to produce in the secondary an electromotive force which assists the smaller of said two electromotive forces.

8. In a dynamo-electric machine, two parallel-connected windings which produce unequal alternating electromotive forces, a transformer having its secondary connected in the local circuit formed by said two windings and its primary winding connected to produce in the secondary an electromotive force which assists the smaller of said two electromotive forces and is substantially equal to the difference between said two electromotive forces.

9. In a dynamo-electric machine, two parallel-connected windings which produce electromotive forces differing in phase, a source of electromotive force, and a transformer having its secondary connected in the local circuit formed by said two windings, and its primary connected to said source to cause said secondary to produce an electromotive force tending to bring said first mentioned electromotive forces into phase with the other.

10. In combination, two parallel connected windings which develop unequal electromotive forces of different phase, and means for equalizing said electromotive forces and bringing such electromotive forces into the same phase.

11. In combination, two windings which are connected in parallel and develop unequal electromotive forces of different phase, and means for producing in the local circuit formed by such two windings a resultant electromotive force which assists the lesser of the former two electromotive forces and brings said electromotive force into the same phase.

12. In combination, two windings which are connected in parallel and develop unequal electromotive forces of different phase, and means for producing in the local circuit formed by such two windings electromotive forces which assist the lesser of the former two electromotive forces and is substantially equal to the difference between such former electromotive forces and for bringing the electromotive forces of said two windings into phase.

13. In combination, two parallel connected windings which develop unequal electromotive forces of different phase, and means for producing a third electromotive force which boosts the lesser of the first two electromotive forces, and for producing a fourth electromotive force for bringing said first two electromotive forces into phase.

14. In combination, two parallel connected windings which develop dissimilar electromotive forces of different phase, and means including two transformers, one for adding to one of said dissimilar electromotive forces an electromotive force tending to prevent such dissimilarity and the other to bring said first two electromotive forces into phase to prevent such dissimilarities in electromotive forces and phase from producing a local current.

15. In combination, a plurality of parallel connected windings which develop dissimilar electromotive forces of different phase, and means for vectorially adding to one of said electromotive forces other electromotive forces tending to make it more nearly similar to the other.

16. In combination, a plurality of parallel connected windings which develop dissimilar electromotive forces of different phase, and means for producing in any local circuit formed by such windings electromotive forces tending to prevent such dissimilarity both in electromotive force and phase from causing a local current.

17. In combination, two parallel connected windings which develop dissimilar alternating electromotive forces of different phase, a source of electromotive force and a plurality of transformers having their secondaries connected in the local circuit formed by said two windings, and their primaries connected to said source to produce in the secondaries electromotive forces tending to oppose any local current which such dissimilarity in electromotive forces and phase tend to produce.

18. In combination, two parallel connected windings which produce unequal alternating electromotive forces of different phase, a source of electromotive force and a plurality of transformers having their secondaries connected in the local circuit formed by said two windings, and their primaries connected to said source to produce in the secondaries electromotive forces which assist the smaller of said two electromotive forces and brings one of said electromotive forces of different phase into phase with the other said electromotive force.

19. In combination, two parallel connected windings which produce unequal alternating electromotive forces of different phase, a source of electromotive force and two transformers having their secondaries connected in the local circuit formed by said two windings, and their primaries connected to said source to produce in the secondaries electromotive forces one of which assists the smaller of said two electromotive forces and is substantially equal to the difference between said two electromotive forces and the other for bringing one of said out of phase electromotive forces into phase.

20. In combination, two parallel connected windings which develop unequal electromotive forces of different phase, mains, and a plurality of transformers having their secondaries connected in the local circuit formed by said two windings, and their primaries connected to different ones of said mains to produce in said secondaries electromotive forces of proper phase and magnitude to prevent any local current which such dissimilarities tend to produce.

Milwaukee, Wis., June 22, 1910.

In testimony whereof I affix my signature, in the presence of two witnesses.

ROBERT B. WILLIAMSON.

Witnesses:
GEO. B. SCHLEY,
CHAS. L. BYRON.